United States Patent
Tozu et al.

(10) Patent No.: US 6,206,490 B1
(45) Date of Patent: Mar. 27, 2001

(54) BRAKE CONTROL SYSTEM FOR A VEHICLE

(75) Inventors: Kenji Tozu, Yokkaichi; Takayuki Itoh, Nagoya; Masanobu Fukami, Hazu gun; Satoshi Yokoyama, Anjo, all of (JP)

(73) Assignee: Aisin Shiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/199,374

(22) Filed: Nov. 25, 1998

(30) Foreign Application Priority Data

Nov. 26, 1997 (JP) .................................................. 9-342069

(51) Int. Cl.⁷ ....................................................... B60T 8/62
(52) U.S. Cl. .......................... 303/168; 303/11; 303/9.62; 303/113.5
(58) Field of Search .............................. 303/10, 11, 9.62, 303/113.5, 186, 187, 188, 189

(56) References Cited

U.S. PATENT DOCUMENTS

| | | | |
|---|---|---|---|
| 5,893,896 | * | 4/1999 | Imamura et al. ....................... 701/70 |
| 5,988,774 | * | 11/1999 | Jonner et al. .......................... 303/189 |
| 6,056,372 | * | 5/2000 | Kamei et al. .......................... 303/155 |

FOREIGN PATENT DOCUMENTS

| | | |
|---|---|---|
| 4128087 | 2/1993 | (DE) . |
| 19853651 | 6/1999 | (DE) . |
| 6-144179 | 5/1994 | (JP) . |
| 8-230634 | 9/1996 | (JP) . |

* cited by examiner

Primary Examiner—Robert J. Oberleitner
Assistant Examiner—Devon Kramer
(74) Attorney, Agent, or Firm—Burns, Doane, Swecker & Mathis, LLP

(57) ABSTRACT

The present invention is directed to a brake control system for a vehicle, wherein a first valve device for opening or closing a main passage, which communicates a master cylinder with wheel brake cylinders, a hydraulic pressure pump for supplying the hydraulic pressure to the main passage, and a second valve device for opening or closing an auxiliary passage, which communicates the inlet of the pressure pump with the master cylinder, are disposed in each hydraulic pressure circuit of a dual hydraulic pressure circuit system. In the case where the slip rate of at least one of the front wheels is smaller than the slip rate of at least one of the wheels belonging to a different hydraulic pressure circuit from the hydraulic pressure circuit to which the one of the front wheels belongs, when the brake pedal is being operated, the hydraulic braking pressure discharged from the pressure pump is applied to one of the wheel brake cylinders operatively mounted on at least one of the front wheels, by controlling the second valve device for example.

10 Claims, 6 Drawing Sheets

BRAKE CONTROL SYSTEM FOR A VEHICLE

This application claims priority under 35 U.S.C. Sec. 119 to No.9-342069 filed in Japan on Nov. 26, 1997, the entire content of which is herein incorporated by reference.

BACKGROUND OF THE INVENTION

1. Field of the Invention

The present invention relates to a brake control system for a vehicle with a dual hydraulic pressure circuit system, wherein the braking force is applied appropriately to wheels in each hydraulic pressure circuit, when a brake pedal is depressed.

2. Description of the Related Arts

Recently, instead of a proportioning valve, it is proposed to employ electromagnetic valves for a braking force distribution control. For example, a Japanese Patent Laid-open Publication No.6-144179 discloses that a rear standard wheel speed is adjusted to be equal to or greater than a front standard wheel speed by actuating pressure control valves (inlet valve and outlet valve) connected to rear wheel brake cylinders to control the braking force applied to the rear wheels, so that a front and rear braking force distribution is approximated to an ideal front and rear braking force distribution. According to the publication, the braking force applied to the rear wheels is controlled such that the rear standard wheel speed is adjusted to be equal to or greater than the front standard wheel speed. In other words, the rear standard wheel speed is controlled not to be smaller than the front standard wheel speed. Therefore, if the braking force applied to the front wheels were reduced due to fade or the like in the front braking system, a decreasing rate of the front wheel speed would be reduced, so that the braking force to the rear wheels might be reduced excessively. As a result, the vehicle speed may not be decreased appropriately.

SUMMARY OF THE INVENTION

Accordingly, it is an object of the present invention to provide a brake control system for a vehicle with a dual hydraulic pressure circuit system, wherein the wheel speed is reduced appropriately even in the case where a slip rate of at least one of the front wheels of the vehicle is smaller than the slip rate of a wheel belonging to a different hydraulic pressure circuit from the hydraulic pressure circuit to which the one of the front wheels belongs.

In accomplish the above and other objects, a brake control system for a vehicle includes wheel brake cylinders operatively mounted on front and rear wheels of the vehicle, respectively, a master cylinder for pressurizing brake fluid to supply braking pressure to the wheel brake cylinders in response to depression of a brake pedal, a pair of main passages for communicating the master cylinder with the wheel brake cylinders to provide a dual hydraulic pressure circuit system. An auxiliary pressure source is provided for pressurizing the brake fluid to supply the hydraulic braking pressure to the main passages. Wheel speed sensors are provided for detecting wheel speeds of the wheels, and a slip rate calculation device is provided for calculating slip rates of the wheels on the basis of the wheel speeds detected by the wheel speed sensors. And, a controller is adapted to apply the hydraulic braking pressure discharged from the auxiliary pressure source to one of the wheel brake cylinders operatively mounted on at least one of the front wheels, in the case where the slip rate of the at least one of the front wheels is smaller than the slip rate of at least one of the wheels belonging to a different hydraulic pressure circuit from the hydraulic pressure circuit to which the at least one of the front wheels belongs, at least when the brake pedal is being operated.

Therefore, in the case where a difference is caused between the slip rates of the front wheels in a diagonal hydraulic pressure circuit system for example, the hydraulic braking pressure discharged from a master cylinder in response to depression of a brake pedal is supplied to the wheel brake cylinder operatively mounted on one of the front wheels having the larger slip rate, whereas the hydraulic braking pressure discharged from the auxiliary pressure source is added to the master cylinder pressure, with respect to the front wheel having the smaller slip rate.

Preferably, the controller is adapted to equalize the hydraulic braking pressure in the wheel brake cylinders operatively mounted on the rear wheels, on the basis of one of the rear wheels having a larger slip rate than the other one of the rear wheels.

In order to equalize the hydraulic braking pressure in the wheel brake cylinders operatively mounted on the rear wheels, on the basis of one of the rear wheels having a larger slip rate than the other wheel, the brake control system may further include a modulator which is disposed between the master cylinder and the wheel brake cylinders in each of the hydraulic pressure circuits for modulating the hydraulic braking pressure in each of the wheel brake cylinders in accordance with a pressure mode selected from at least a pressure increase mode and a pressure decrease mode.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
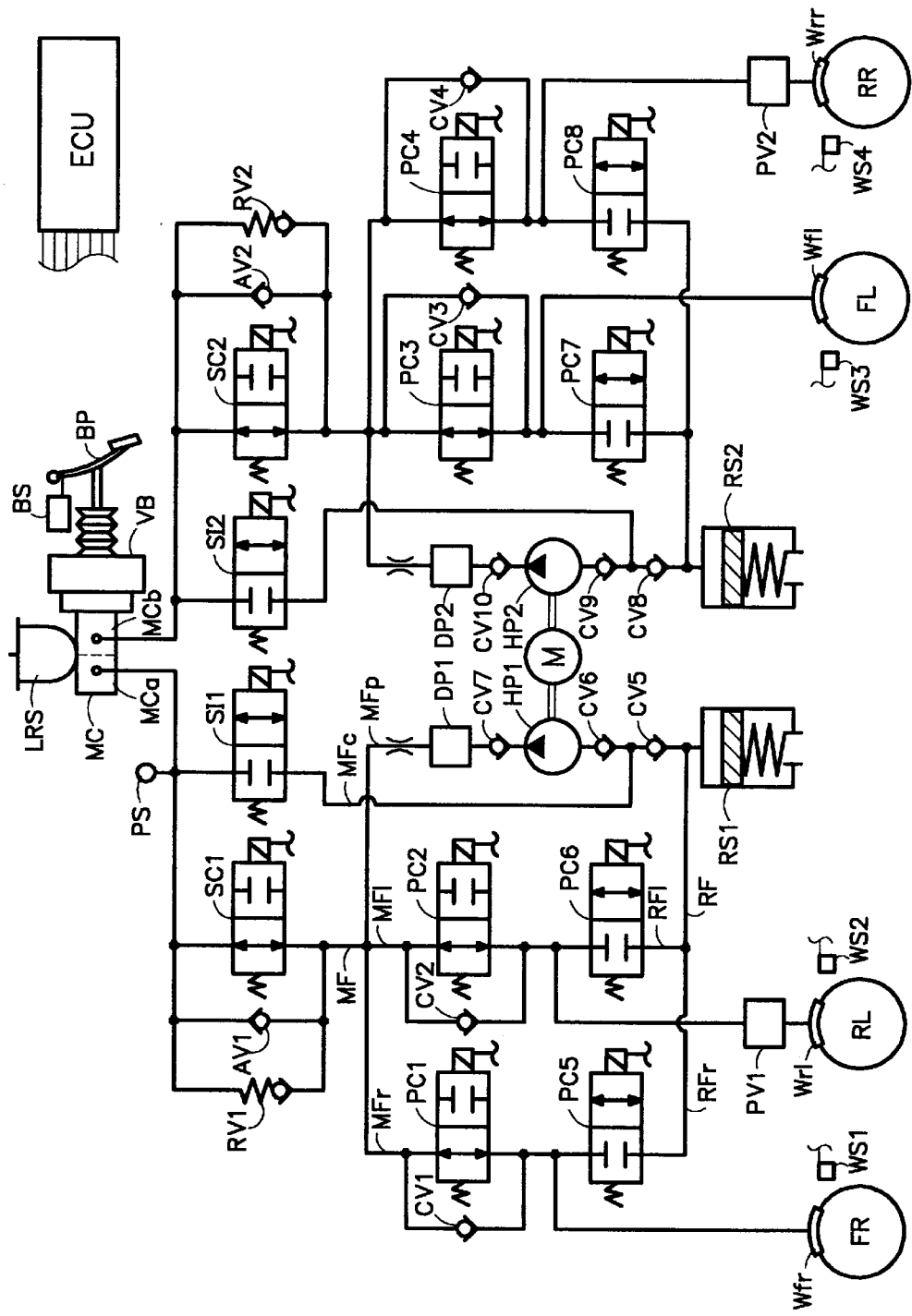
FIG. 1 is a block diagram illustrating a brake control system according to an embodiment of the present invention.

Referring to FIG. 1, there is schematically illustrated a brake control system according to the present invention, wherein wheel brake cylinders Wfl, Wfr, Wrl, Wrr are operatively mounted on the front wheels FL, FR and rear wheels RL, RR of the vehicle, respectively. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. According to the present embodiment, the hydraulic pressure circuit is divided into two circuits to provide a diagonal circuit (X-circuit) system, or front-rear dual circuit system.

Wheel speed sensors WS1 to WS4 are provided for the wheels FR, RL, FL and RR, respectively, and connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released. Also, the pressure sensor PS is connected to the electronic controller ECU, so that the signal indicative of the master cylinder pressure is input to the electronic controller ECU. The electronic controller ECU is provided with a microcomputer (not shown) which includes a central processing unit (CPU), memories (ROM, RAM), an input port, an output port, and etc. The signals detected by each of the wheel speed sensors WS1 to WS4, brake switch BS and etc. are fed to the input port via respective amplification circuits (not shown) and then to the central processing unit. Then, control signals are fed from the output port to the solenoid valves as described later via the respective driving circuits (not shown). In the electronic controller ECU, the memory (ROM) memorizes a program corresponding to flowcharts shown in FIGS. 2–4, the central processing unit (CPU) executes the program while the ignition switch (not shown) is closed, and the memory (RAM) temporarily memorizes variable data needed to execute the program.

According to the present embodiment, a master cylinder MC is activated through a vacuum booster VB in response to depression of a brake pedal BP to pressurize the brake fluid in a low-pressure reservoir LRS and discharge the master cylinder pressure to the hydraulic pressure circuits for the wheels FR, RL and the wheels FL, RR, respectively. The master cylinder MC is of a tandem type having two pressure chambers communicated with two hydraulic pressure circuits, respectively. That is, a first pressure chamber MCa is communicated with the hydraulic pressure circuit for the wheels FR, RL, and a second pressure chamber MCb is communicated with the hydraulic pressure circuit for the wheels FL, RR.

In the hydraulic pressure circuit for the wheels FR, RL, the first pressure chamber MCa is communicated with wheel brake cylinders Wfr, Wrl respectively, through a main passage MF and its branch passages MFr, MFl. A normally open first solenoid valve SC1 (hereinafter, simply referred to as a solenoid valve SC1) is disposed in the main passage MF, to act as a so-called cut-off valve. Also, the first pressure chamber MCa is communicated through an auxiliary passage MFc with check valves CV5, CV6, which will be described later. A normally closed second solenoid valve SI1 (hereinafter, simply referred to a solenoid valve SI1) is disposed in the auxiliary passage MFc. Each of the solenoid valves SC1, SI1 is formed by a two-port two-position solenoid operated valve. In the main passage MF, a pressure sensor is connected to detect the master cylinder pressure, which is output to an electronic controller ECU, as a signal varied in response to depression of the brake pedal BP. As for the sensor for detecting the operating condition of the brake pedal BP, a stroke sensor for detecting the stroke of the brake pedal BP may be employed.

And, normally open two-port two-position solenoid valves PCd, PC2 (hereinafter, simply referred to as solenoid valves PC1, PC2) are disposed in the branch passages MFr, MFl, respectively, and in parallel therewith check valves CV1, CV2, respectively. The check valve CV1, CV2 are provided for allowing the flow of the brake fluid toward the master cylinder MC and preventing the flow toward the wheel brake cylinders Wfr, Wrl. The brake fluid in the wheel brake cylinders Wfr, Wrl is returned to the master cylinder MC, and then to the low-pressure reservoir LRS through the check valves CV1, Cv2 and the solenoid valve SC1 placed in its open position as shown in FIG. 1. Accordingly, if the brake pedal BP is released, the braking pressure in the wheel brake cylinders Wfr, Wrl is rapidly reduced to the pressure lower than the pressure at the master cylinder MC. And, normally closed two-port two-position solenoid valves PC5, PC6 (hereinafter, asimply referred to as solenoid valves PC5, PC6) are disposed in the branch passages RFr, RFl, respectively, which merge into the drain passage RF connected to the reservoir RS1.

In the hydraulic pressure circuit for the wheels FR, RL, the solenoid valves PC1, PC2, and solenoid valves PC5, PC6 form the modulators of the present invention, respectively. A hydraulic pressure pump HP1 is disposed in a passage MFp connected to the branch passages MFr, MFl at the upstream of the solenoid valves PC1, PC2, and an outlet of the pressure pump HP1 is connected to the solenoid valves PC1, PC2 through a check valve CV7. The pressure pump HP1 and a pressure pump HP2 in the other hydraulic pressure circuit are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and spring to function as an accumulator for storing a necessary volume of the brake fluid for various controls.

The master cylinder MC is connected to a position between the check valves CV5 and CV6 disposed at the inlet side of the pressure pump HP1 through the passage MFc. The check valve CV5 is provided for preventing the flow of the brake fluid toward the reservoir RS1 and allowing the reverse flow. The check valves Cv6, CV7 are provided for restricting the flow of the brake fluid discharged from the pressure pump HP1 to a predetermined direction, and normally formed within the pressure pump HP1 in a body. Accordingly, the solenoid valve SI1 is normally placed in the closed position as shown in FIG. 1, where the communication between the master cylinder MC and the inlet of the pressure pump HP1 is blocked, and switched to the open position where the master cylinder MC is communicated with the inlet of the pressure pump HP1.

In parallel with the solenoid valve SC1, is disposed a relief valve RV1 which prevents the brake fluid in the master cylinder MC from flowing toward the solenoid valves PC1, PC2, and allows the brake fluid to flow toward the master cylinder MC when the braking pressure at the solenoid valves PC1, PC2 is more than the braking pressure at the master cylinder MC by a predetermined pressure difference, and a check valve AV1 which allows the flow of the brake fluid toward the wheel brake cylinders Wfr, Wrl, and prevents its reverse flow. The relief valve RV1 is provided for returning the brake fluid to the low-pressure reservoir LRS through the master cylinder MC when the pressurized braking pressure discharged from the pressure pump HP1 is more than the braking pressure discharged from the master cylinder MC by the predetermined pressure difference, thereby to modulate the braking pressure in the main passage MF not to exceed a predetermined pressure. Because of the check valve AV1, even if the solenoid valve SC1 is in its closed position, when the brake pedal BP is depressed, the hydraulic braking pressure in the wheel brake cylinders Wfr, Wrl is increased. A damper DP1 is disposed at the outlet side of the pressure pump HP1, and a proportioning valve PV1 is disposed in a passage connected to the rear wheel brake cylinder Wrl.

In the hydraulic pressure circuit for the wheels FL, RR, are disposed a reservoir RS2, damper DP2, proportioning valve PV2, normally open two-port two-position solenoid valve SC2 (first solenoid valve), normally closed two-port two-position solenoid valves SI2 (second solenoid valve), PC7, PC8, normally open two-port two-position solenoid valves PC3, PC4, check valves CV3, CV4, CV8–CV10, relief valve RV2, and check valve AV2. The pressure pump HP2 is driven by the electric motor M together with the pressure pump HP1, both of the pumps HP1 and HP2 will be driven continuously after the motor M starts to operate them. In the following flowcharts, the valves or the like for use in the two hydraulic pressure circuits are represented by adding "*" to each reference. The solenoid valves SC1, SC2, SI1, SI2 and PC1–PC8 are controlled by the electronic controller ECU to perform the control modes such as the anti-skid control mode.

In operation, every valves are placed in their normal positions and the motor M is stopped as shown in FIG. 1, during the normal braking operation. When the brake pedal BP is depressed in the conditions as shown in FIG. 1, the master cylinder MC is actuated to discharge the master cylinder pressure from the first and second pressure chambers MCa, MCb to the hydraulic pressure circuit for the wheels FR, RL, and the hydraulic pressure circuit for the wheels FL, RR, respectively, and supply the pressure into the wheel brake cylinders Wfr, Wrl, Wfl, Wrr, through the solenoid valves SC1, SC2 and the solenoid valves PC1–PC8. Since the hydraulic pressure circuits for the wheels FR, RL and wheels FL, RR are substantially the same, only the hydraulic pressure circuit for the wheels FR, RL will be explained hereinafter.

During the braking operation, when the wheel FR tends to be locked for example, and the anti-skid control is initiated, the solenoid valve PCd is changed to its closed position, and the solenoid valve PC5 is placed in its open position, while the solenoid valve SC1 is placed in its open position. As a result, the brake fluid in the wheel brake cylinder Wfr is drained into the reservoir RS1 through the solenoid valve PC5 to reduce the pressure in the wheel brake cylinder Wfr. When a pulse pressure increase mode is selected for the wheel brake cylinder Wfr, the solenoid valve PC5 is placed in its closed position and the solenoid valve PC1 is placed in its open position, so that the master cylinder pressure is supplied from the master cylinder MC to the wheel brake cylinder Wfr through the solenoid valve Pcd in its open position. Then, the solenoid valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the solenoid valve PC5 is placed in the closed position, and then the solenoid valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1 and the solenoid valve SC1 in its open position, and consequently to the low pressure reservoir LRS. Thus, an independent braking force control is performed with respect to each wheel.

According to the present embodiment as constituted above, a program routine for various controls including the auxiliary brake control, anti-skid control and so on is executed by the electronic controller ECU, as will be described hereinafter with reference to FIGS. 2-5. The program routine starts when an ignition switch (not shown) is turned on. At the outset, the program provides for initialization of the system at Step 101 to clear various data. At Step 102, the signals detected by the wheel speed sensors WS1 to WS4 are read by the electronic controller ECU. Then, the program proceeds to Step 103 where the wheel speed $Vw^{}$ ( represents one of the wheels FL, FR, RL, RR) of each wheel is calculated, and differentiated to provide the wheel acceleration $DVw^{}$. At Step 104, the maximum of the wheel speeds $Vw^{}$ for four wheels is calculated to provide an estimated vehicle speed Vso on a gravity center of the vehicle ($Vso=MAX[Vw^{}]$), and an estimated vehicle speed $Vso^{}$ is calculated for each wheel, respectively, on the basis of the wheel speed $Vw^{}$. The estimated vehicle speed $Vso^{}$ may be normalized to reduce the error caused by a difference between the wheels located on the inside and outside of the curve while cornering. Furthermore, the estimated vehicle speed Vso is differentiated to provide an estimated vehicle deceleration DVso on the gravity center of the vehicle. In this respect, the estimated vehicle deceleration is used for the convenience of explanation. When its sign is opposite, it indicates an estimated vehicle acceleration. At Step 105, also calculated is an actual slip rate $Sa^{}$ for each wheel, on the basis of the wheel speed $Vw^{}$ and the estimated vehicle speed $Vso^{**}$ (or, the estimated and normalized vehicle speed) which are calculated at Steps 103 and 104, respectively, in accordance with the following equation:

$$Sa^{} = (Vso^{}-Vw^{})/Vso^{}$$

Then, at Step 106, a coefficient of friction $\mu$ against a road surface is calculated on the basis of the vehicle deceleration DVso. In order to detect the coefficient of friction, various devices may be employed, such as a sensor for directly detecting the coefficient of friction against the road surface, for example. And, the program proceeds to Step 107, where it is determined whether the starting conditions for the anti-skid control mode have been fulfilled or not. If it has been fulfilled, the program proceeds to Step 108 where the anti-skid control mode is set, and a desired slip rate therefor is set. Otherwise, the program returns to Step 109 where the auxiliary brake control is performed, as will be described later. And, after the abnormality is checked at Step 110, the braking force to each wheel is controlled according to the hydraulic pressure servo control, the program returns to Step 102.

Figure 2:
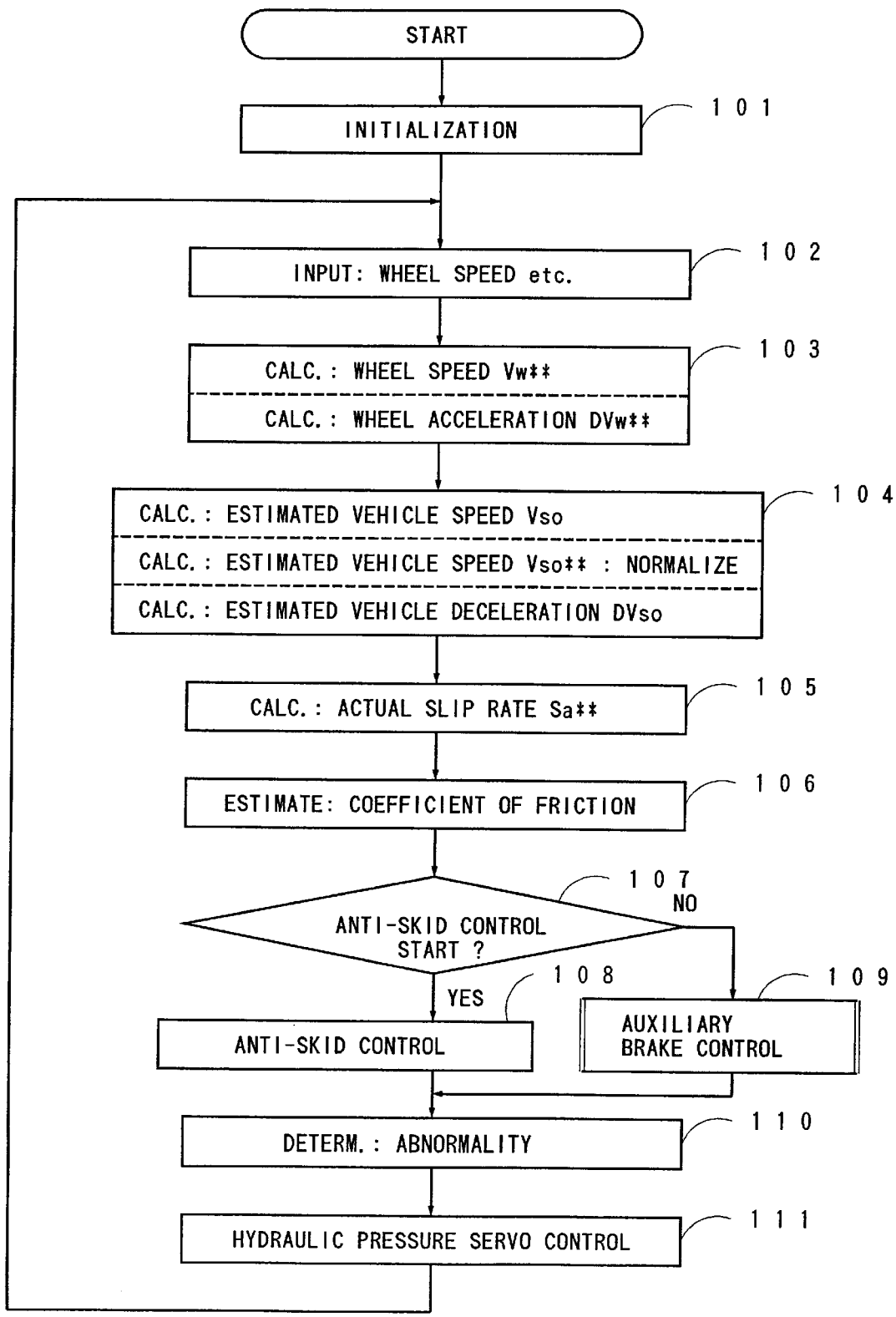
FIG. 2 is a flowchart showing a main routine of the brake control according to an embodiment of the present invention.
Figure 3:
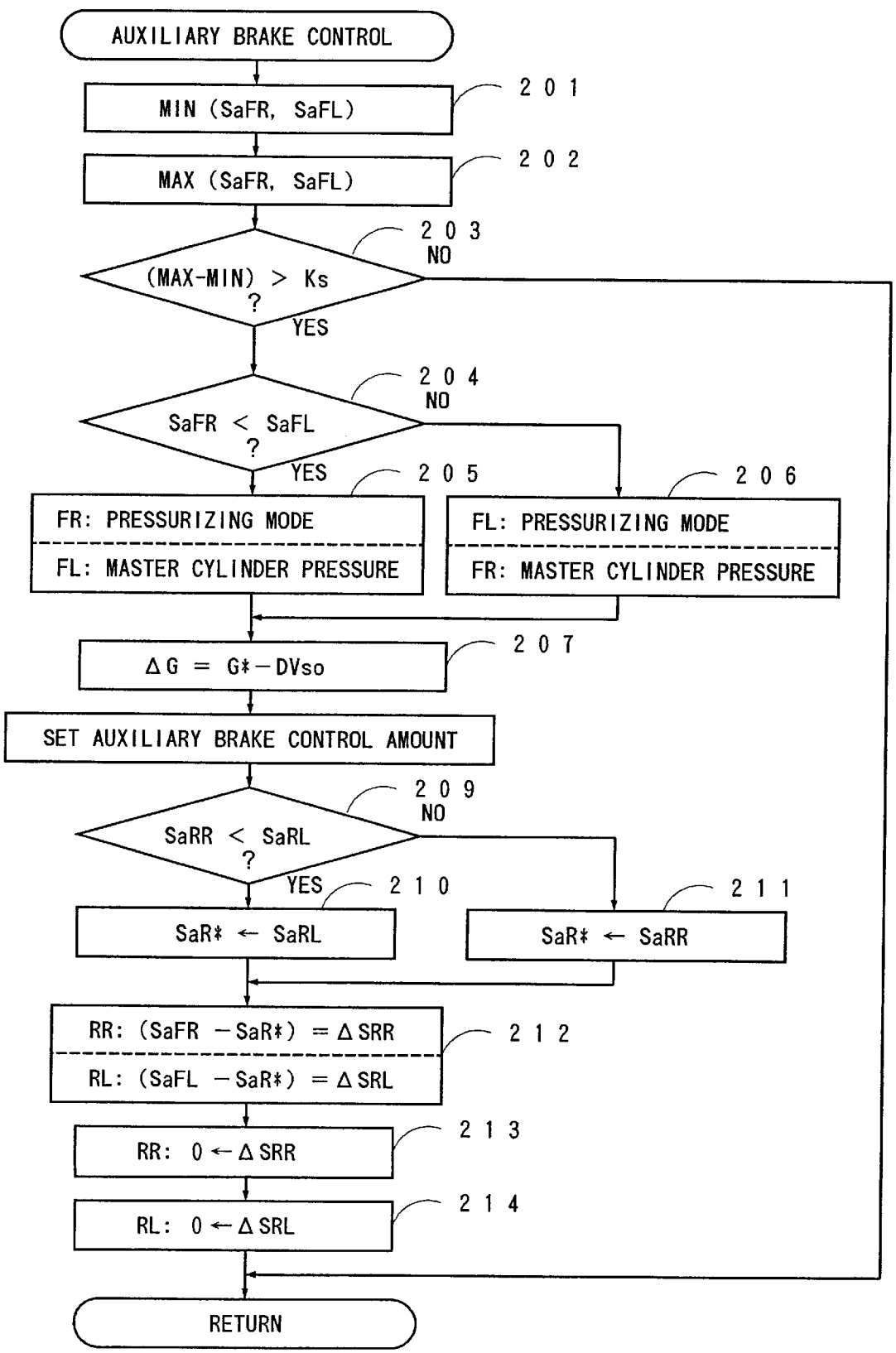
FIG. 3 is a flowchart showing a sub-routine of an auxiliary brake control according to an embodiment of the present invention.

FIG. 3 shows the auxiliary brake control executed at Step 109 in FIG. 2. At Step 201, a slip rate of the smaller value between the slip rates SaFR, SaFL (i.e., MIN(SaFR, SaFL)) is calculated. Next, at Step 202, a slip rate of the larger value between the slip rates SaFR, SaFL (i.e., MAX(SaFR, SaFL)) is calculated. Then, a difference between the slip rate (MAX(SaFR, SaFL)) and slip rate (MIN(SaFR, SaFL)) is compared with a predetermined value Ks. If it is determined that the difference is equal to or smaller than the predetermined value Ks, the program returns to the main routine. If it is determined that the difference is larger than the predetermined value Ks, the program proceeds to Steps 204-206 where the wheel cylinder pressure for each wheel will be controlled. At Step 204, it is determined which is larger between the slip rate SaFR of front wheel FR, and the slip rate SaFL of front wheel FL. If the slip rate SaFR is smaller than the slip rate SaFL, the program proceeds to Step 205 where a pressurizing mode is set to the wheel brake cylinder operatively mounted on the wheel FR of the smaller slip rate, so that the wheel brake cylinder of the wheel FR will be pressurized by the pressure pump HP1 until the wheel cylinder pressure will exceed the master cylinder pressure, while the wheel brake cylinder of the wheel FL will be pressurized to the master cylinder pressure as shown in FIG. 1. Whereas, if the wheel brake cylinder operatively mounted on the wheel FL is the smaller one, the program proceeds to Step 206 where the pressurizing mode is set to the wheel brake cylinder operatively mounted on the wheel FL of the smaller slip rate, so that the wheel brake cylinder of the wheel FL will be pressurized until the wheel cylinder pressure will exceed the master cylinder pressure, while the wheel brake cylinder of the wheel FR will be pressurized to the master cylinder pressure.

Figure 6:
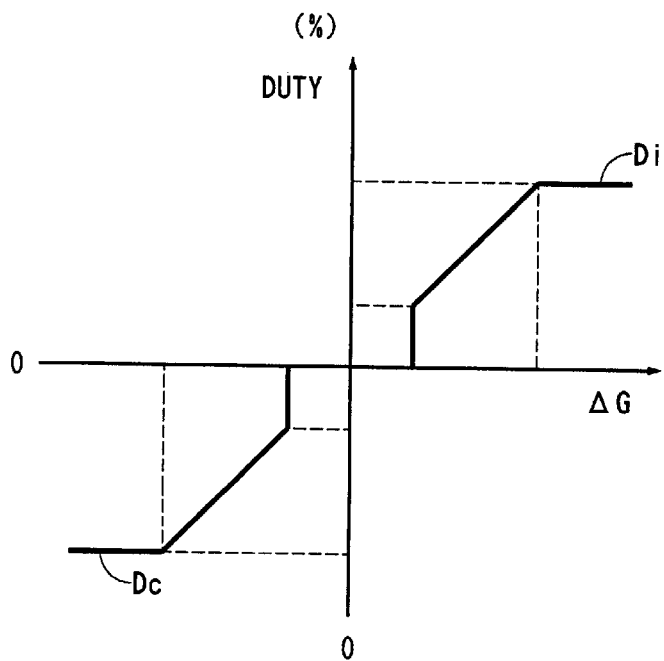
FIG. 6 is a diagram showing an example of operation of the solenoid valves SC*, SI* to control the wheel cylinder pressure for each front wheel according to an embodiment of the present invention.

Then, at Step 207, a deceleration difference ΔG between a desired vehicle deceleration G* and an estimated vehicle deceleration DVso which represents the actual vehicle deceleration is calculated (ΔG=G*−DVso). The desired vehicle deceleration G* is calculated by adding a deceleration Δg, which is provided in accordance with a predetermined hydraulic braking pressure for the auxiliary brake control, to the actual vehicle deceleration Gm, which is obtained on the basis of the pressure detected by the pressure sensor PS, for example, or the stroke of the brake pedal. The program further proceeds to Step 208, where the amount of the auxiliary brake control is calculated. For example, a duty Di and a duty Dc are set for the solenoid valves SI*, SC*, which are disposed in the hydraulic pressure circuit (left side or right side in FIG. 1) including the wheel with the pressurizing mode set thereto, as shown in FIG. 6. That is, the amount of the auxiliary brake control is set by controlling at least the solenoid valve SI*, without controlling the solenoid valves PC1, PC5, or valves PC3, PC7 (with these solenoid valves held in the conditions as shown in FIG. 1).

The program proceeds to Step 209, where the slip rates SaRR, SaRL of the rear wheels RR, RL are compared in gratitude. If the slip rate SaRL is larger than the slip rate SaRR, the program proceeds to Step 210, where the slip rates SaR* of the wheels RR, RL under control are set to be the larger slip rate SaRL. If the slip rate SaRR is larger than the slip rate SaRL, the program proceeds to Step 211, where the slip rates SaR* of the wheels RR, RL under control are set to be the larger slip rate SaRR. Thus, the wheel brake cylinders of the rear wheels RR, RL are controlled on the basis of the wheel brake cylinder in which the hydraulic braking pressure is to be decreased, so as to comply with the requirements of the vehicle stability. Next, at Step 212, a difference ΔSRR between the slip rate SaFR of the front right wheel FR and the slip rate SaRR of the rear right wheel RR, and a difference ΔSRL between the slip rate SaFL of the front left wheel FL and the slip rate SaRL of the rear left wheel RL is calculated. In other words, the slip rate difference between the front and rear wheels placed at the same side of the vehicle (left or right) is calculated. Then, the program proceeds to Steps 213, 214, where the differences ΔSRR, ΔSRL are set to be zero, and the wheel cylinder pressure in each wheel brake cylinder of the rear wheels RR, RL is controlled by actuating the solenoid valves PC2, PC6 and solenoid valves PC4, PC8 to be opened or closed. As a result, the braking force distribution is made between the front and rear wheels of the vehicle. Consequently, the wheel cylinder pressure is controlled with respect to every wheel except for the front wheel with the larger slip rate, thereby to distribute the braking force between the front and rear wheels, and between the left and right wheels, appropriately.

While the diagonal hydraulic pressure circuit system is employed according to the present embodiment, the front and rear hydraulic pressure circuit system may be employed. In the latter system, the pressurizing mode is set to the front wheels FR, FL, so that the wheel brake cylinders Wfr, Wfl are pressurized automatically by the pressure pump HP1, provided that the following conditions are fulfilled;

[MAX(*SaFR, SaRR*)−MIN(*SaFR, SaRR*)]>K1, and/or

[MAX(*SaFL, SaRL*)−MIN(*SaFL, SaRL*)]>K2

Figure 4:
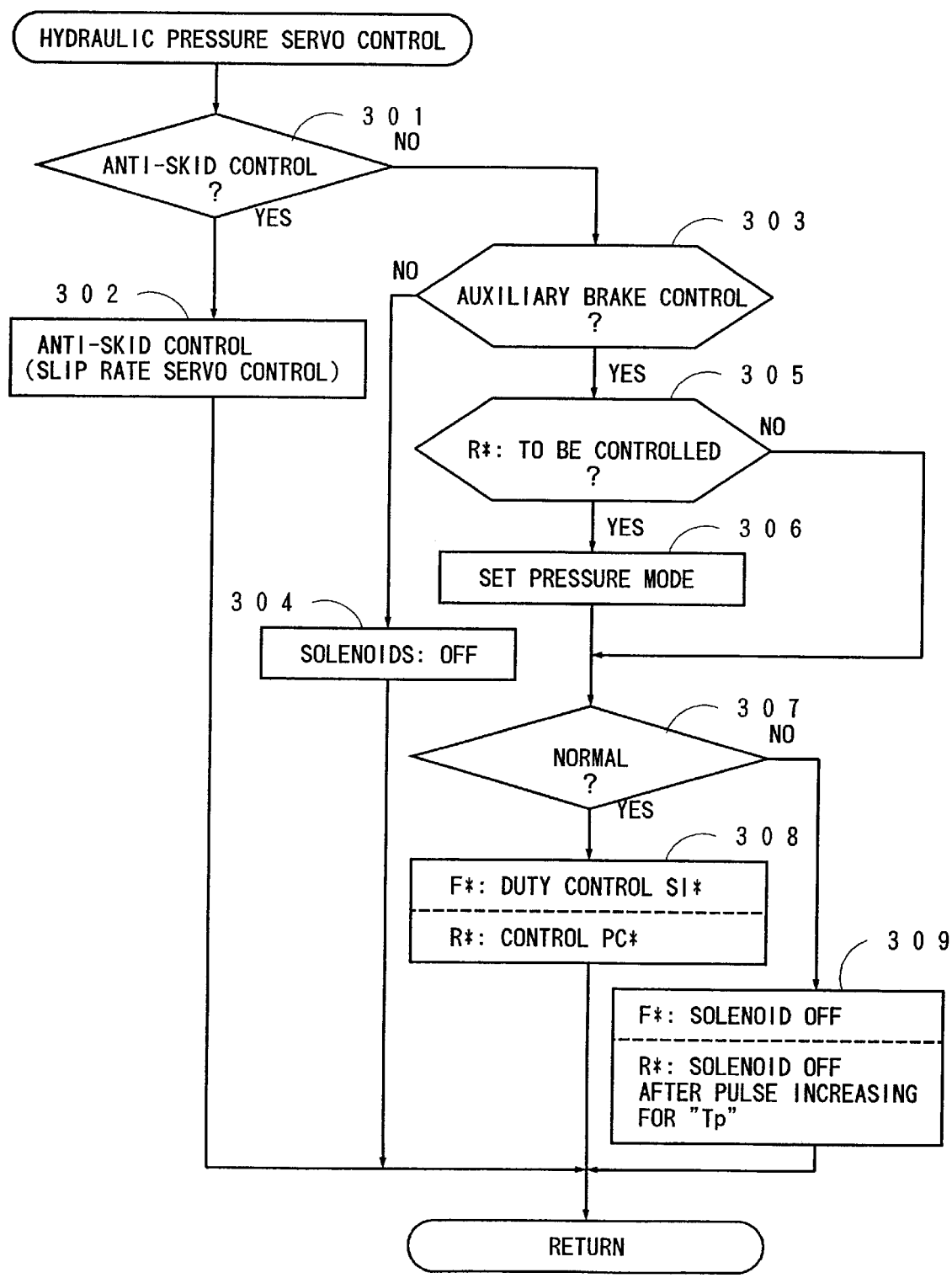
FIG. 4 is a flowchart showing a hydraulic pressure servo control according to an embodiment of the present invention.
Figure 7:
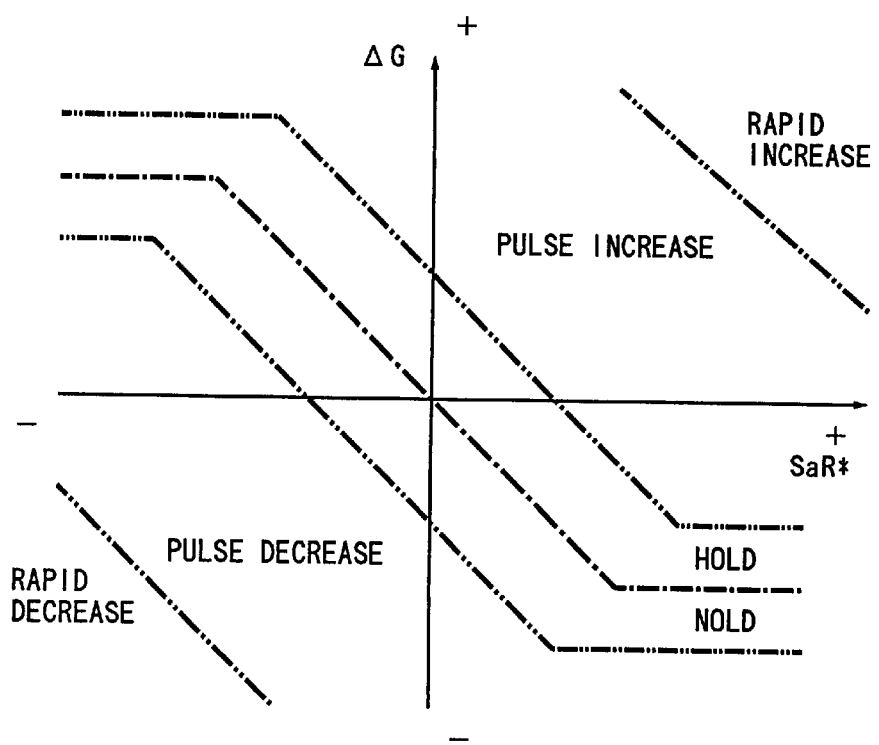
FIG. 7 is a diagram showing a relationship between pressure modes and parameters for use in the hydraulic pressure control with respect wheel brake cylinders operatively mounted on the rear wheels.

FIG. 4 shows the hydraulic servo control executed on the basis of the slip rate of each wheel at Step 111 in FIG. 2. At the outset, it is determined at Step 301 whether the anti-skid control is being controlled, or not. If the result is affirmative, the program proceeds to Step 302 where the slip rate servo control for the anti-skid control is performed. If the anti-skid control is not being performed, the program proceeds to Step 303 where it is determined whether the auxiliary brake control is being performed or not. If the auxiliary brake control is not being performed, the program proceeds to Step 304 where all of the solenoid valves are turned off, and returns to the main routine in FIG. 2. When it is determined at Step 303 that the auxiliary brake control is being performed, the program proceeds to Step 305 where the rear wheel R* (RR or RL) is to be controlled or not. If the result is affirmative, the program proceeds to Step 306 where a pressure mode is selected in accordance with a control map as shown in FIG. 7. The control map has a rapid pressure decrease zone, a pulse pressure decrease zone, a pressure hold zone, a pulse pressure increase zone, and a rapid pressure increase zone, which are provided in advance as shown in FIG. 7, so that any one of the zones is selected in accordance with the slip rate SaR* and the vehicle deceleration difference ΔG, which are used as parameters of the control map, and the pressure mode fallen in that zone is set at step 306. Then, the program proceeds to Step 307. If it is determined at Step 305 that the rear wheel R* is not to be controlled, the program proceeds to Step 307, without setting any pressure mode (i.e., solenoids are off).

At Step 307, the abnormality is determined. If no abnormality is found, the program proceeds to Step 308, where the duty of the solenoid valve SI* is controlled with respect to the front wheel F* to be controlled, and the solenoid valve PC* (PC2, PC4, or PC6, PC8) is actuated with respect to the rear wheel R*, in accordance with the pressure mode as described above. When any abnormality is found, the program proceeds to Step 309, where the solenoid valve SI* and etc. for use in controlling the wheel F* are turned off immediately, whereas the pulse pressure increase mode is set for a predetermined time period Tp, before they are turned off, with respect to the rear wheel R*. As a result, the terminating control in case of abnormality is performed smoothly.

Figure 5:
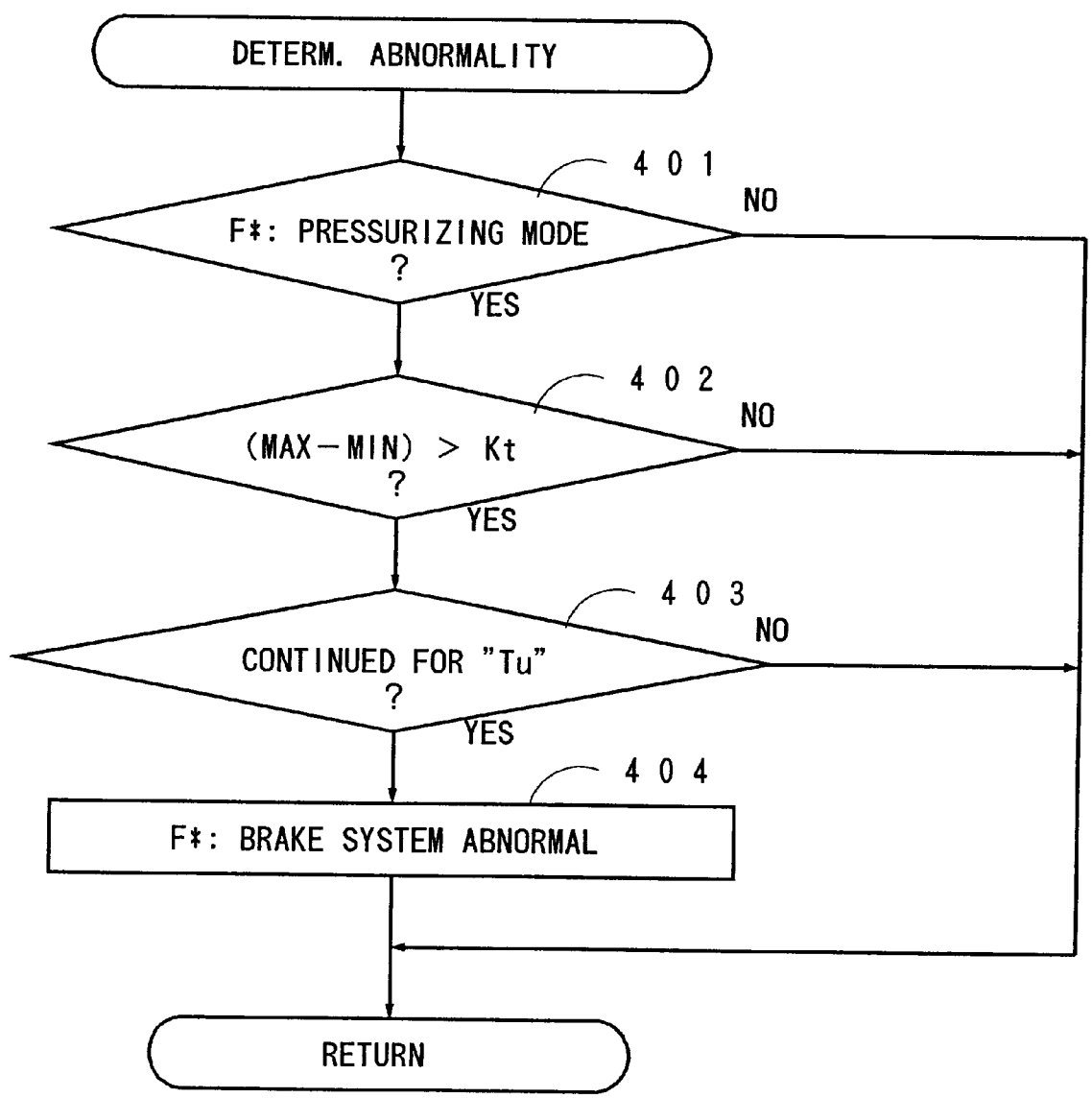
FIG. 5 is a flowchart showing determination of abnormality according to an embodiment of the present invention.

FIG. 5 shows the determination of the abnormality executed at Step 110 in FIG. 2, wherein the abnormality in braking operation, such as the fade, defect of pad and the like, will be determined. First of all, it is determined at Step 401 whether the pressurizing mode is being performed with respect to one of the front wheels. If the pressurizing mode is being performed, the program further proceeds to Steps 402 and 403, where the value of [MAX(SaFR, SaFL)−MIN(SaFR, SaFL)] exceeded the predetermined value Kt has lasted for a predetermined time period Tu, then the program proceeds to Step 404 where it is determined that the brake system of the wheel F* is abnormal. When the results of determination at steps 401–403 are negative, the program returns to the main routine.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for a vehicle comprising:

wheel brake cylinders operatively mounted on front and rear wheels of said vehicle, respectively;

a master cylinder for pressurizing brake fluid to supply hydraulic braking pressure to said wheel brake cylinders in response to depression of a brake pedal;

a pair of main passages for communicating said master cylinder with said wheel brake cylinders to provide a dual hydraulic pressure circuit system;

an auxiliary pressure source for pressurizing the brake fluid to supply the hydraulic braking pressure to said main passages;

wheel speed sensors for detecting wheel speeds of said wheels;

slip calculation means for calculating slip of said wheels on the basis of the wheel speeds detected by said wheel speed sensors; and control means for comparing the slip of at least one of said front wheels with the slip of at least one of the wheels belonging to a hydraulic pressure circuit different from the hydraulic pressure circuit to which said at least one of said front wheels belongs, and for applying the hydraulic braking pressure discharged from said auxiliary pressure source to said wheel brake cylinder operatively mounted on said at least one of said front wheels, in the case where the slip of said at least one of said front wheels is smaller than the slip of said at least one of said wheels belonging to a different hydraulic pressure circuit from the hydraulic pressure circuit to which said at least one of said front wheels belongs, at least when said brake pedal is being operated.

2. A brake control system as set forth in claim 1, wherein said control means is adapted to equalize the hydraulic braking pressure in said wheel brake cylinders operatively mounted on said rear wheels, on the basis of one of said rear wheels having a larger slip than the other one of said rear wheels.

3. A brake control system as set forth in claim 2, wherein said control means includes modulator means disposed between said master cylinder and said wheel brake cylinders in each hydraulic pressure circuit for modulating the hydraulic braking pressure in each of said wheel brake cylinders in accordance with a pressure mode selected from at least a pressure increase mode and a pressure decrease mode.

4. A brake control system as set forth in claim 1, further comprising:

a pair of first valve means for opening or closing said main passages, respectively;

a pair of pump means disposed between said first valve means and said wheel brake cylinders in said main passages, respectively, said pump means introducing from an inlet thereof the brake fluid and pressurizing the brake fluid to supply the hydraulic braking pressure to said wheel brake cylinders;

a pair of auxiliary passages for communicating each inlet of said pump means with said master cylinder; and a pair of second valve means for opening or closing said auxiliary passages, respectively, and wherein said control means is adapted to control said second valve means communicated with one of said wheel brake cylinders operatively mounted on at least one of said front wheels, in the case where the slip of said at least one of said front wheels is smaller than the slip of at least one of said wheels belonging to a different hydraulic pressure circuit from the hydraulic pressure circuit to which said at least one of said front wheels belongs, at least when said brake pedal is being operated.

5. A brake control system as set forth in claim 4, wherein said control means includes modulator means disposed between said first valve means and said wheel brake cylinders in each hydraulic pressure circuit for modulating the hydraulic braking pressure in each of said wheel brake cylinders in accordance with a pressure mode selected from at least a pressure increase mode and a pressure decrease mode.

6. A brake control system as set forth in claim 5, wherein said control means is adapted to equalize the hydraulic braking pressure in said wheel brake cylinders operatively mounted on said rear wheels, on the basis of one of said rear wheels having a larger slip than the other one of said rear wheels.

7. A brake control system as set forth in claim 6, wherein said control means is adapted to calculate a first difference between the slip of the front right wheel and the slip of the rear right wheel, and calculate a second difference between the slip of the front left wheel and the slip of the rear left wheel, and wherein said control means is adapted to actuate said modulator means to reduce the first difference and the second difference to be zero, respectively.

8. A brake control system as set forth in claim 5, wherein said control means is adapted to control a duty of said second valve means with respect to said front wheels, and wherein said control means is adapted to control said modulator means with respect to said rear wheels.

9. A brake control system as set forth in claim 5, wherein said control means is adapted to turn off said second valve means immediately with respect to said front wheels, when any abnormality is found, and wherein said control means is adapted to provide a pulse pressure increase mode for a first predetermined time period before terminating the control of said modulator means with respect to said rear wheels, when any abnormality is found.

10. A brake control system as set forth in claim 9, wherein said control means is adapted to determine the abnormality, when a third difference between the slip of said front wheels exceeds a predetermined value continuously for a second predetermined time period.

* * * * *

UNITED STATES PATENT AND TRADEMARK OFFICE
CERTIFICATE OF CORRECTION

PATENT NO. : 6,206,490 B1
DATED : March 27, 2001
INVENTOR(S) : Kenji Tozu, et al.

It is certified that error appears in the above-identified patent and that said Letters Patent is hereby corrected as shown below:

<u>Title page,</u>
Delete "[73]   Assignee: Aisin Shiki Kabushiki Kaisha, Kariya (JP)" and insert
-- [73]   Assignee: Aisin Seiki Kabushiki Kaisha, Kariya (JP) --

Signed and Sealed this

Twentieth Day of November, 2001

Attest:

NICHOLAS P. GODICI
*Attesting Officer*  *Acting Director of the United States Patent and Trademark Office*